(No Model.)
J. CHAUMONT.
HANDLE FOR COVERS OF VESSELS.
No. 276,772. Patented May 1, 1883.
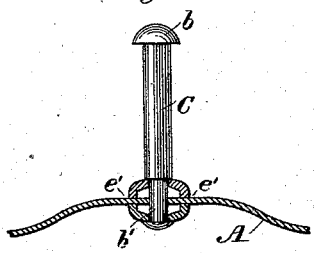
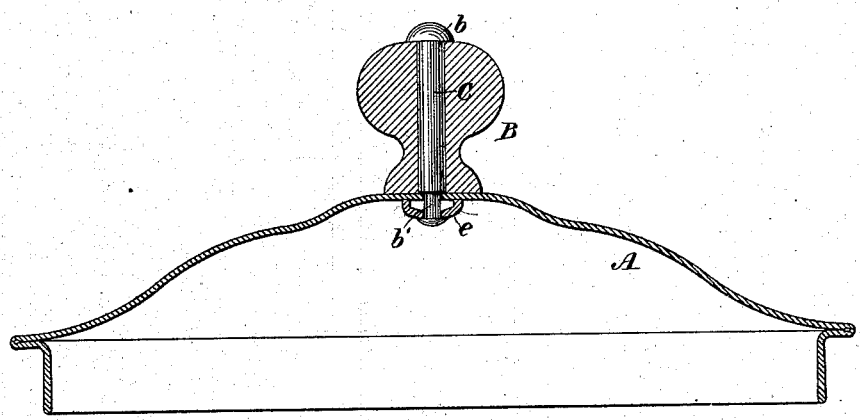
WITNESSES
Wm A. Skinkle
Jos. S. Latimer
INVENTOR
Jules Chaumont,
By his Attorneys
Pope Edgecomb & Butler

UNITED STATES PATENT OFFICE.

JULES CHAUMONT, OF WOOD HAVEN, ASSIGNOR TO THE LALANCE & GROSJEAN MANUFACTURING COMPANY, OF NEW YORK, N. Y.

HANDLE FOR COVERS OF VESSELS.

SPECIFICATION forming part of Letters Patent No. 276,772, dated May 1, 1883.

Application filed February 12, 1883. (No model.)

*To all whom it may concern:*

Be it known that I, JULES CHAUMONT, a citizen of the United States, residing at Wood Haven, in the county of Queens and State of New York, have invented a certain new and useful Improvement in Handle Attachments for Sheet-Metal Vessel-Covers, of which the following is a specification.

My invention relates to the attachment of handles or knobs to the covers of culinary or other vessels, and it is especially adapted to enameled sheet-metal ware.

Heretofore it has been usual to attach wooden handles or knobs to the sheet-metal covers of vessels by means of a rivet extending vertically through the knob and provided with a lateral enlargement or head at its upper extremity. The lower part of the knob rests against the top of the cover, and the lower extremity of the rivet extends through an aperture formed in the same. The lower projecting end of the rivet has been either soldered to the lower surface of the cover or expanded by hammering, so as to bear directly against the cover, thus clamping or holding the knob to the cover between head and the expanded or soldered extremity of the rivet. These methods have proved to be inefficient and unreliable, especially when applied to enameled sheet-metal ware. In this ware it has been found nearly impossible to attach the knob by expanding the lower end of the rivet without causing the enamel to crack and scale off from the surface of the cover, which allows access of moisture to the metal, which soon rusts and the cover becomes useless. It is also extremely difficult to prevent a handle or knob from splitting, when fastened by this method of riveting, on account of the changes in temperature to which the utensil is subjected, and the consequent expansions and contractions of the metal with which the handle is in contact. When the handle splits the ordinary rivet falls until the head rests upon the cover, and great annoyance and difficulty are met with in lifting the cover from the vessel. If the handle does not split, it is apt soon to become loose, which is also a great annoyance. Again, it has been found impracticable to secure the extremity of the rivet to an enameled cover by soldering, for the reason that the solder will not adhere to the glaze constituting the enameled surface. As the solder has only the small surface of the end of the rivet to adhere to, it is soon loosened by use, and the handle comes off.

The object of my invention is to provide means for attaching handles or knobs to the covers of vessels of this description without fracturing or impairing the enamel or other substance with which the same may be coated, and to attach them in such a manner that they are far less liable to split or become loose than by the methods heretofore in use.

In the accompanying drawings, which illustrate my invention, Figure 1 is a transverse vertical section of one form of my invention, and Fig. 2 is a similar view of a different form of joint.

Referring to Fig. 1, A is an ordinary cover or lid of sheet-metal for inclosing the mouth of the vessel. B is a handle or knob, preferably of wood or other non-conductor of heat. C is the metallic rivet, extending vertically through the knob, and is provided with a head, $b$. The lower portion, $b'$, of the rivet C is formed of a smaller diameter than the main body, and extends through an aperture in the cover, as shown. The lower end of the main portion C forms a shoulder, which, by the aid of the expanded extremity of the portion $b'$, tightly clamps the rivet, with the washer $e$, to the cover A, independently of the knob B, which latter is supported upon the body C of the rivet.

In Fig. 3 I have shown a modification in which two washers are employed—one upon the upper and the other upon the lower surface of the cover A—forming a joint of increased strength and elasticity.

By means of the improved joint above described the handle or knob B may be supported with or without being longitudinally compressed or clamped between the head and lower expanded extremity of the rivet, depending upon the relative lengths of the knob and the main portion C of the rivet. It will be seen, therefore, that if the knob is loosely supported upon the rivet it will not be affected by the contraction and expansion of the metallic parts; but, if the same should be so tightly clamped to the cover of the vessel as to be split by these causes, the rivet, by reason of its firm and independent attachment to the cover, may still be utilized as a handle.

I have found that by the use of washers of the peculiar shape I have described, in combination with the rivets, as shown, knobs or handles may be fastened neatly and securely to the covers of enameled vessels without destroying the enamel, while the elasticity of the washers prevents the knob from becoming loose or from being split by changes in temperature of the metal.

I claim as my invention—

1. The combination, substantially as hereinbefore set forth, with the cover A, of the handle or knob, the rivet extending therethrough, having a shoulder formed at or near its lower extremity, and the dish-shaped washer secured between the lower extremity of the rivet and the inner surface of the cover.

2. The combination, substantially as hereinbefore set forth, with the cover A, of the handle or knob, the rivet extending therethrough, having a shoulder formed at or near its lower extremity, and the two dish-shaped washers embracing the cover, and respectively clamped in position by means of the shoulder formed upon the rivet and the laterally-enlarged extremity of the same.

In testimony whereof I have hereunto subscribed my name this 8th day of February, A. D. 1883.

JULES CHAUMONT.

Witnesses:
JAMES COCHRAN,
LEWIS L. FOSDICK.